United States Patent Office 3,008,957
Patented Nov. 14, 1961

3,008,957
6β,19-OXIDO PREGNANES
Howard J. Ringold and Albert Bowers, Mexico City, Mexico, assignors to Syntex S.A., Mexico City, Mexico, a corporation of Mexico
No Drawing. Filed July 29, 1960, Ser. No. 46,077
Claims priority, application Mexico Jan. 6, 1960
21 Claims. (Cl. 260—239.55)

The present invention relates to novel cyclopentanophenanthrene compounds and to a process for the preparation thereof.

More particularly, the present invention relates to novel 6β,19-oxido and lactones of the pregnane series having a keto or a hydroxyl group at C-3, a keto group at C-20 and which may also contain a hydroxy or acyloxy group at C-17α and unsaturation at C-1,2 and C-4,5.

The novel compounds of the present invention which are progestational agents having anti-androgenic, anti-estrogenic and anti-gonodotropic activities as well as being bacteriostatic against gram positive and gram negative bacteria, are represented by the following formulas:

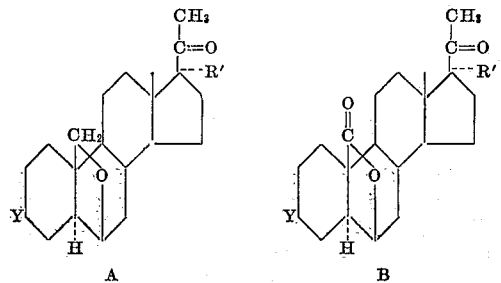

In the above formulas, Y represents keto, β-hydroxy or β-acyloxy; X represents β-hydroxy or β-acyloxy and R' represents hydrogen, hydroxy or acyloxy. When Y is keto in compounds of Formula A, unsaturation may be present at C-1,2 and C-4,5.

The acyl groups are derived from hydrocarbon carboxylic acids containing up to 12 carbon atoms, saturated or unsaturated, of straight, branched, cyclic or cyclic-aliphatic chain, aromatic and may be substituted by functional groups such as hydroxyl, acyloxy of up to 12 carbon atoms, alkoxy of up to 8 carbon atoms, amino or halogen. Typical ester groups include the acetate, propionate, butyrate, hemisuccinate, enanthate, caproate, benzoate, phenoxyacetate, trimethylacetate, aminoacetate, cyclopentylpropionate and β-chloropropionate.

The novel compounds of the present invention are also cardiac anti-fibrillatory agents, lower the blood cholesterol and are useful in the treatment of pre-menstrual tension.

The novel compounds of the present invention are prepared by a method illustrated by the following equation:

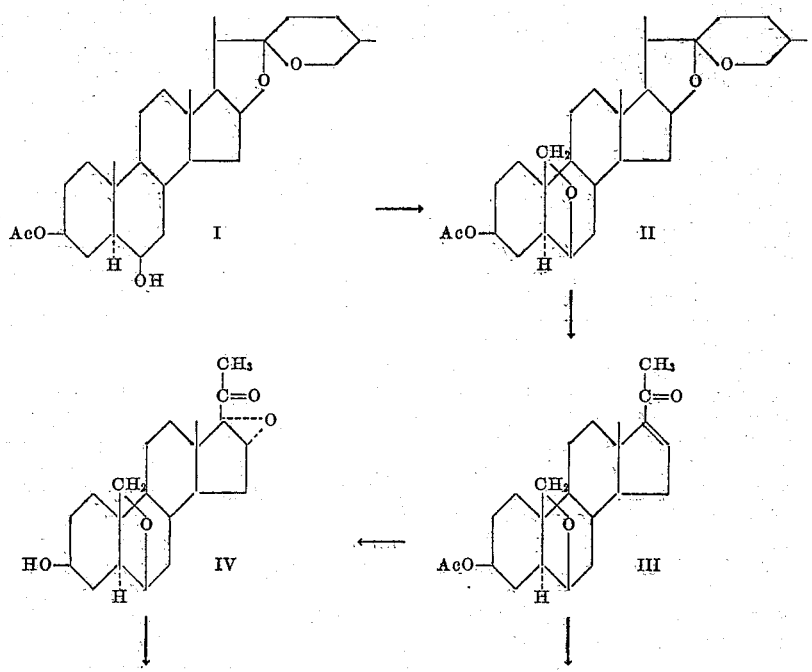

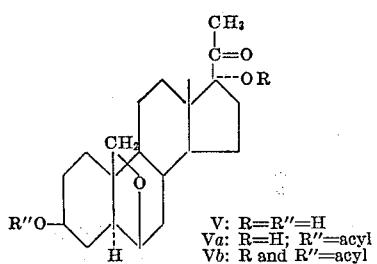

V: R=R''=H
Va: R=H; R''=acyl
Vb: R and R''=acyl

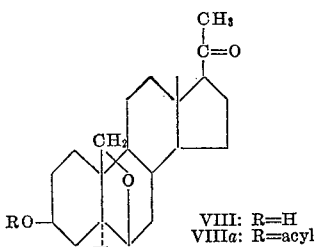

VIII: R=H
VIIIa: R=acyl

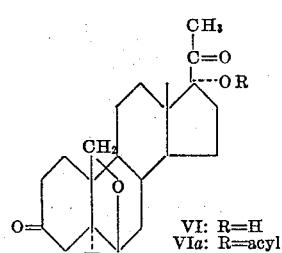

VI: R=H
VIa: R=acyl

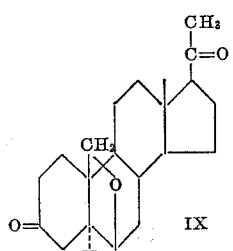

IX

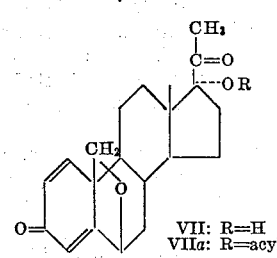

VII: R=H
VIIa: R=acyl

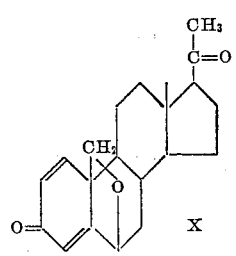

X

In the above equation, Ac represents acetyl; however, other acyl groups derived from hydrocarbon carboxylic acids containing up to 12 carbon atoms of the type previously described may be employed.

In practicing the process outlined above, the starting material 6β-hydroxy-tigogenin acetate is prepared by converting diosgenin acetate into the 5α-bromo-6β-hydroxy derivative by reaction with hypobromous acid or a system which generates hypobromous acid such as N-bromoacetamide and perchloric acid. Upon subsequent treatment with 8 N chromic acid, the 6β-hydroxy group is oxidized to the keto group and the 5α-bromo group is then removed by reductive debromination as by treatment with zinc in acetic acid to thus form 6-keto-tigogenin acetate. Upon hydrogenation of the latter compound in mixture of acetic acid and ethanol and in the presence of a catalyst such as platinum oxide the keto group is reduced to the hydroxyl group and there is formed 6β-hydroxy-tigogenin acetate (I). Alternatively the reduction may be carried out with lithium aluminum tri-tertiary butoxyhydride.

The latter compound (I) is refluxed for about five hours with lead tetraacetate, preferably in a solvent such as benzene, to form 6β,19-oxido-tigogenin acetate (II). Degradation of the side chain is then effected by conventional methods such as heating the sapogenin (II) with acetic anhydride in a closed vessel, followed by hydrolysis of the excess of acetic anhydride, oxidation with chromic trioxide in acetic acid, and cleavage of the acid residue at C–16 by refluxing with a mixture of potassium hydroxide and acetone to thus produce 6β,19-oxido-Δ16-pregnen-3β-ol-20-one, which is reesterified at C–3 by conventional esterification methods to finally produce 3β-acyloxy - 6β,19-oxido-Δ16-pregnen-20-one (III), preferably the 3-acetate thereof.

For formation of the novel compounds of the present invention containing a hydroxy or acyloxy group at C17α, the 3β-acyloxy-6β,19-oxido-Δ16-pregnen-20-one (III) is reacted with aqueous alkaline hydrogen peroxide to form the 16α,17α-oxide (IV) with simultaneous saponification of the ester group. The latter compound is then reacted with hydrogen bromide in glacial acetic acid to open the 16α,17α-epoxide ring to produce 6β,19-oxido-16β-bromo-pregnane-3β,17α-diol-20-one which is then transformed into the 6β,19-oxido-pregnan-3β,17α-diol-20-one (V) by removal of the 16β-bromo group by reductive debromination as by treatment with hydrogen in the presence of a catalyst such as Raney nickel or palladium on calcium carbonate. Esterification by conventional methods with hydrocarbon carboxylic acid anhydrides or chlorides containing less than 12 carbon atoms affords the 3-monoesters (Va). Esterification of the C–17α-hydroxyl group may then be effected with the same or different hydrocarbon carboxylic acid anhydride in benzene solution and in the presence of p-toluenesulfonic acid to thus afford the 3,17-diesters having the same or different ester groups (Vb). The diesters having the same ester groups may also be prepared in one step by employing the latter method of esterification of the free 3β,17α-diol with the desired acid anhydride.

Upon treatment of the 6β,19-oxido-pregnane-3β,17α-diol-20-one (V) with chromic acid in acetone the 3β-hydroxyl group is converted into the 3-keto group and there is thus formed the 6β,19-oxido pregnan-17α-ol-3,20-dione (VI) which upon esterification in the manner described above with hydrocarbon carboxylic acid anhydrides in benzene solution and in the presence of p-toluenesulfonic acid is converted into the 17α-ester derivatives (VIa). Upon dehydrogenation of the latter compound as by heating with 2,3-dichloro-5,6-dicyano-1,4- benzoquinone, there is obtained 6β,19-oxido-Δ$^{1,4}$-pregnadien-17α-ol-3,20-dione acylate (VIIa).

For formation of the novel compounds of the present invention lacking a hydroxyl or acyloxy group at C–17α, the 3β-acyloxy-6β,19-oxido-Δ$^{16}$-pregnen-20-one (III) is hydrogenated in methanol in the presence of a catalyst such as palladium on carbon to thus produce 3β-acyloxy-6β,19-oxido-pregnan-20-one (VIIIa), which upon hydrolysis as by treatment with dilute methanolic potassium hydroxide is converted into the free alcohol 6β,19-oxido-pregnan-3β-ol-20-one (VIII). Alternatively, the latter compound is produced by the hydrogenation in the same manner of 6β,19-oxide-Δ$^{16}$-pregnen-3β-ol-20-one formed by the saponification of compound III. The 6β,19-oxido-pregnan-3β-ol-20-one (VIII) is then oxidized with 8 N chromic acid in acetone to form the 6β,19-oxido pregnane-3,20-dione (IX) which can then be dehydrogenated as by refluxing with 2,3-dichloro-5,6-dicyano-1,4-benzoquinone in a solvent such as dioxane for a period of time in the order of 18 hours to finally produce 6β,19-oxido-Δ$^{1,4}$-pregnadiene-3,20-dione (X).

The formation of the novel lactones of the present invention can be illustrated by the following equation:

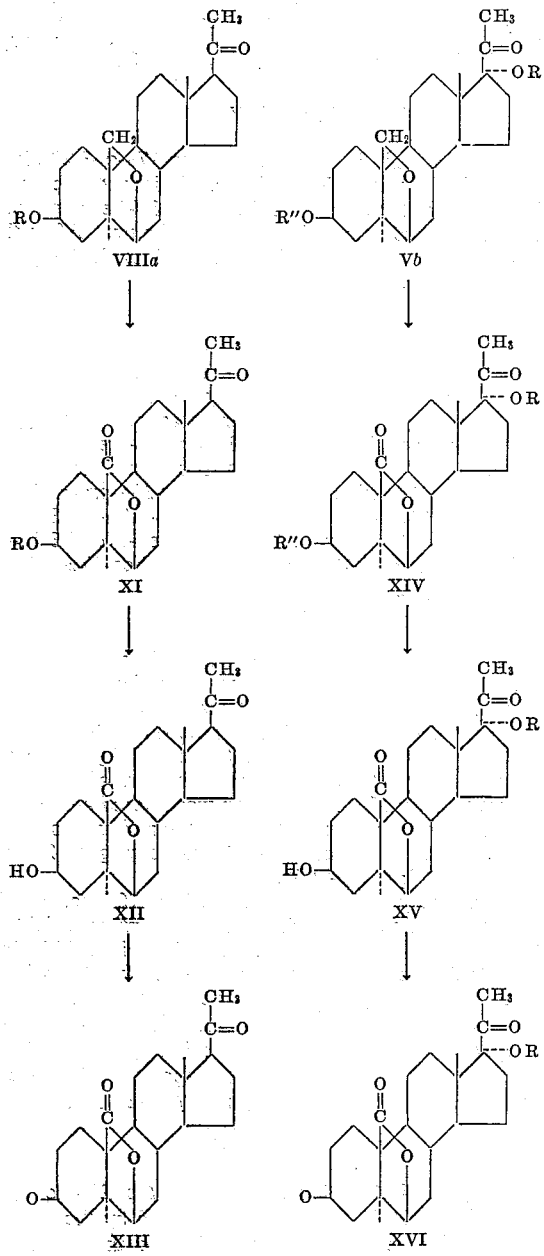

In the above equations R and R″ represent the acyl radical of hydrocarbon carboxylic acids of the type described hereinabove.

In practicing the above invention, the 6β,19-oxido-pregnan-3β-ol-20-one acylate (VIIIa) or 6β,19-oxido-pregnan-3β,17α-diol-20-one diacylate (Vb) is oxidized with chromic acid in aqueous acetic acid to form the corresponding 6,19-lactone, more specifically, the 6,19-lactone of 3β-acyloxy-6β-hydroxy-20-keto-pregnane-19-carboxylic acid (XI) or the 6,19-lactone of 6β-hydroxy-20-keto-3β,17α-diacyloxy-pregnane-19-carboxylic acid (XIV). By tretament of the aforesaid 6,19-lactone with dilute methanolic potassium hydroxide, there is formed the 6,19-lactone of 3β,6β - dihydroxy-20-keto-pregnane-19-carboxylic acid (XII) or the 6,19-lactone of 3β,6β-dihydroxy-17α-acyloxy-20-keto-pregnane-19-carboxylic acid (XV), which can then be oxidized with chromic acid to the corresponding 3-keto-compounds (XIII) and (XVI) respectively.

The following examples serve to illustrate but are not intended to limit the scope of the present invention:

*Example I*

5 g. of diosgenin acetate was suspended in 50 cc. of dioxane and treated with 6 cc. of 0.46 N perchloric acid and then with 2 g. of N-bromoacetamide, the latter was added little by little, with stirring during the course of an hour, in the dark and maintaining the temperature at about 15° C. The mixture was stirred for 1 hour further in the dark at room temperature and then decolorized by the addition of 10% aqueous sodium bisulfite solution; 1 liter of water was added and the product was extracted with methylene chloride. The extract was washed with water, dried over anhydrous sodium sulphate and the solvent was evaporated under reduced pressure and at room temperature. The residue consisted of the 3-acetate of 5α-bromo-6β-hydroxy-tigogenin.

There was prepared 50 cc. of an 8 N solution of chromic acid from 13.4 g. of chromium trioxide, 12.5 cc. of concentrated sulfuric acid and distilled water. A solution of 5 g. of the 3-acetate of 5α-bromo-6β-hydroxytigogenin in 50 cc. of acetone was cooled to 0° C., flushed with nitrogen and treated with the 8 N solution of chromic acid until the characteristic color of chromium trioxide persisted in the mixture. The 8 N chromic acid solution was added in a thin stream under an atmosphere of nitrogen and with stirring at 0° C. The mixture was then stirred at 0° C., under an atmosphere of nitrogen for two minutes further, poured into ice water and the precipitate formed was collected by filtration, washed with water, dried under vacuum, thus furnishing the 3-acetate of 5α-bromo-6-keto-tigogenin.

The above compound was mixed with 5 g. of zinc dust and 125 cc. of glacial acetic acid, according to the method described in our copending patent application Serial No. 45,790, filed July 28, 1960, and heated at 90° C. for 1 hour at the end of which it was filtered through celite, the filtrate was concentrated to a small volume under reduced pressure, cooled and diluted with ice water to precipitate the 3-acetate of 6-keto-tigogenin.

The above compound was dissolved in a mixture of 40 cc. of absolute ethanol and 60 cc. of glacial acetic acid and hydrogenated in a "Parr" instrument at 50 atmospheres in the presence of 0.6 g. of platinum oxide at room temperature for 24 hours, at the end of which the catalyst was removed by filtration and the filtrate was evaporated to dryness under reduced pressure. Chromatography of the residue on neutral alumina gave the pure 3-acetate of 6β-hydroxy-tigogenin.

To a solution of 2 g. of the 3-acetate of 6β-hydroxy-tigogenin in 75 cc. of dry benzene was added 3 g. of lead tetraacetate and the mixture was refluxed for 5 hours. It was then cooled, filtered, diluted with water and the benzene layer was separated, washed with water and the benzene was evaporated under reduced pressure. By chromatography of the residue on neutral alumina there was obtained the 3-acetate of 6β,19-oxido-tigogenin; M.P. 197–1990°; [α]$_D$ −65.5°.

Example II

A mixture of 1.0 g. of 6β,19-oxido-tigogenin acetate and 4 cc. of acetic anhydride was heated in a sealed tube for 2 hours at 195° C. The resulting mixture was cooled, the excess of anhyride was hydrolyzed by adding 100 cc. of water, and allowed to stand for one hour. 500 mg. of chromic trioxide in 12 cc. of acetic acid was then added and the mixture was stirred for three hours at room temperature; it was then diluted with water, extracted with ether and the extract was washed with water, dried over sodium sulphate and the ether was evaporated. The residue was refluxed with a mixture of 10 cc. of 60% aqueous acetone containing 0.5 g. of potassium hydroxide for five hours, the mixture was concentrated to a small volume, cooled, diluted with water and extracted with ether. The extract was washed with water, dried over anhydrous sodium sulfate and evaporated to dryness. By recrystallization from acetone-hexane there was obtained 6β,19-oxido-3β-hydroxy-Δ$^{16}$-pregnen-20-one.

Reesterification of the 3β-hydroxy group was effected by conventional reaction with acetic anhydride in pyridine. Thus a mixture of 2.0 g. of 6β,19-oxido-3β-hydroxy-Δ$^{16}$-pregnen-20-one, 10 cc. of pyridine and 10 cc. of acetic anhydride was allowed to remain overnight at room temperature. After the usual work-up, there was obtained the 3β - acetoxy - 6β,19-oxido-Δ$^{16}$-pregnen-20-one; M.P. 238–239°; [α]$_D$ + 19°; λ$_{max}$, 240; log ε 4.02.

In a similar conventional manner there was also prepared the propionate, butyrate, cyclopentylpropionate and benzoate.

Example III

A solution of 0.07 mol of 6β,19-oxido-Δ$^{16}$-pregnen-3β-ol-20-one-acetate in 150 parts of methanol was cooled to 15° C. and 5.1 parts of 35% hydrogen peroxide was added. A solution of 0.4 part of sodium hydroxide in 2.5 parts of water was then added with stirring and cooling at such a rate that the temperature did not exceed 25° C. After being allowed to stand at room temperature for 17 hours, the mixture was poured into 400 parts of cold water which was then acidified with dilute hydrochloric acid. The precipitated 16α,17α-oxide of 6β,19-oxide-pregnan-3β-ol-20-one was collected, washed with water and dried.

Example IV 1 part of the 16α,17α-oxide of 6β,19-oxido-pregnane-3β-ol-20-one was dissolved in 25 parts of acetic acid and added, at room temperature with stirring, to a solution of 0.285 part of glacial acetic acid saturated with hydrogen bromide. After half an hour, the mixture was poured into water, the precipitate was filtered and washed with water until neutral. There was thus obtained 6β,19-oxido-16β-bromo-3β,17α-dihydroxy-pregnan-20-one.

The crude bromhydrin was dissolved in 14.2 parts of ethanol and was stirred overnight with 0.85 part of Raney nickel under an atmosphere of hydrogen. The suspension was filtered through celite, the filter was washed with hot ethanol, the washings and filtrate were combined and then evaporated to dryness. By crystallization from methanol, there was obtained 6β,19-oxido-pregnan-3β,17α-diol-20-one.

1 g. of the above compound was dissolved in 50 cc. of dry benzene and treated with 2 g. of acetic anhydride in the presence of 200 mg. of p-toluenesulfonic acid and let stand at room temperature overnight. It was then poured into water, the formed precipitate filtered and recrystallized from acetone-ether, thus, affording the diacetate of 6β,19-oxido-pregnane-3β,17α-diol-20-one.

Example V

A solution of 2 g. of 6β,19-oxido-pregnan-3β,17α-diol-20-one, obtained as described in the preceding example in 100 cc. of acetone was cooled to 0° C. and treated under an atmosphere of nitrogen under stirring with a solution of 8 N chromic acid until the color of the reagent persisted in the mixture. The oxidizing agent had been prepared by dissolving 26.7 g. of chromium trioxide in 23 cc. of concentrated sulfuric acid and diluting with water to 100 cc.; the mixture was then stirred for 5 minutes more at 0–10°, diluted with water and the precipitate was collected, washed with water, dried and recrystallized from ether, thus affording 6β,19-oxido-pregnan-17α-ol-3,20-dione.

Example VI 1 g. of 6β,19-oxido-pregnam-17β-ol-3,20-dione in 50 cc. of dry benzene was treated with 1 g. of acetic anhydride in the presence of 200 mg. of p-toluenesulfonic acid at room temperature and the mixture was allowed to stand for 24 hours. Isolation of the product by extraction with ethyl acetate and crystallization of the residue from acetone-hexane yielded 6β,19-oxido-17α-acetoxy-pregnane-3,20-dione.

By substituting the acetic anhydride by other hydrocarbon carboxylic acid anhydrides such as propionic anhydride, butyric anhydride, benzoic acid anhydride, enanthic anhydride, there were produced the corresponding 17α-propionate, 17α-butyrate, 17α-benzoate and 17α-enanthate of 6β,19-oxido-pregnan-17α-ol-3,20-dione.

Example VII

To 1.0 g. of 6β,19-oxido-pregnan-17α-ol-3,20-dione (prepared in Example V) in 50 cc. of dioxane, there was added 3.0 g. of 2,3-dichloro-5,6-dicyano-1,4-benzoquinone and the mixture was refluxed for 18 hours. After the usual work-up, there was obtained 6β,19-oxido-Δ$^{1,4}$-pregnadien-17α-ol-3,20-dione.

Example VIII

By substituting in the preceding Example the 6β,19-oxido-pregnan-17α-ol-3,20-dione by 6β,19-oxido-pregnan-17α-ol-3,20-dione-17-acetate, there was obtained 6β,19-oxido-Δ$^{1,4}$-pregnadien-17α-ol-3,20-dione-17-acetate.

In a similar manner there was obtained the corresponding 6β-19-oxido - 17α-propionoxy-Δ$^{1,4}$-pregnadiene-3,20-dione; 6β,19-oxido-Δ$^{1,4}$-pregnadien - 17α-ol - 3,20-dione-butyrate; 6β,19-oxido-Δ$^{1,4}$-pregnadien-17α-ol-3,20-dione benzoate and 6β,19-oxido-Δ$^{1,4}$-pregnadien-17α-ol-3,20-dione enanthate.

Example IX

A suspension of 5% palladium on carbon (0.5 part) in methanol (50 parts) was hydrogenated for 30 minutes. A solution of 0.005 mol of 3β-acetoxy-6β,19-oxido-Δ$^{16}$-pregnen-20-one (prepared in Example II) in 200 parts of methanol was added to the catalyst and hydrogenated under stirring until one molar equivalent of hydrogen had been absorbed. The solution was filtered and evaporated to dryness; recrystallization of the residue from acetone afforded 3β - acetoxy-6β,19-oxido-pregnan-20-one, M.P. 141–142°; [α]$_D$ +66°.

The above product was dissolved in 100 cc. of 2% methanolic potassium hydroxide and kept overnight at room temperature. It was then acidified with 2 N hydrochloric acid, heated for half an hour on the steam bath, cooled, diluted with ice water and the product was extracted with several portions of ether. The combined extract was washed with water, dried over anhydrous sodium sulfate and the ether was evaporated. There was thus obtained 6β,19-oxido-pregnan-3β-ol-20-one.

Example X 2 g. of 6β,19-oxido-Δ$^{16}$-pregnen-3β-ol-20-one (described in Example II) was hydrogenated by the method described in the preceding example and there was obtained 6β,19-oxido-pregnan-3β-ol-20-one, identical with the final product obtained in the preceding example.

*Example XI*

By following the method described in Example V, 2 g. of 6β,19-oxido-pregnan-3β-ol-20-one was oxidized to form 6β,19-oxido-pregnane-3,20-dione, M.P. 214–216°; [α]D +121°.

*Example XII*

By following the procedure of Example VII, 6β,19-oxido-pregnane-3,20-dione was dehydrogenated in the same manner to afford 6β,19-oxido-Δ$^{1,4}$-pregnadiene-3,20-dione.

*Example XIII*

To a solution of 3.0 g. of the acetate of 6β,19-oxido-pregnan-3β-ol-20-one prepared in Example IX, in 60 cc. of acetic acid was added 3.0 g. of chromium trioxide dissolved in 100 cc. of 90% acetic acid. The reaction mixture was maintained at 90° for 1 hour and the product was precipitated by the addition of ice water and collected. Recrystallization from acetone-hexane yielded the 6,19-lactone of pregnane-3β,6β-diol-20-one-19-carboxylic acid-3-acetate.

2.0 g. of the above compound was treated with 2% methanolic potassium hydroxide in the same manner described in Example IX to furnish the 6,19-lactone of pregnane-3β,6β-diol-20-one-19-carboxylic acid.

*Example XIV*

2.0 g. of the above compound was dissolved in 100 cc. of acetone and treated with 8 N chromic acid in the same manner as described in Example V. After the usual work-up, there was finally afforded the 6,19-lactone of pregnan-6β-ol-3,20-dione-19-carboxylic acid.

*Example XV*

By substituting in the method of Example XIII the 6β,19-oxido-pregnan-3β-ol-20-one acetate by 6β,19-oxido-pregnan-17α-ol-3,20-dione acetate (cf. Example VI), there was obtained the 6,19-lactone of pregnane-6β,17α-diol-3,20-dione-19-carboxylic acid-17-acetate.

We claim:
1. A compound of the following formula:

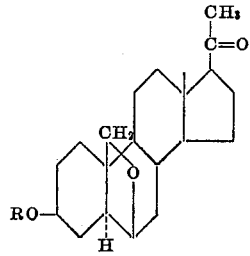

wherein R is selected from the group consisting of hydrogen and a hydrocarbon carboxylic acyl group containing less than 12 carbon atoms.
2. 6β,19-oxido-pregnan-3β-ol-20-one.
3. 6β,19-oxido-pregnan-3β-ol-20-one acetate.
4. A compound of the following formula:

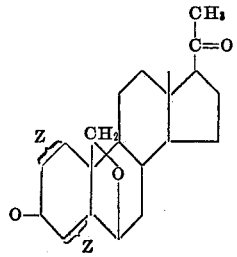

wherein Z is selected from the group consisting of a double bond between C-1,2 and C-4,5 and of a saturated linkage between C-1,2 and C-4,5.
5. 6β,19-oxido-pregnane-3,20-dione
6. 6β,19-oxido-Δ$^{1,4}$-pregnadiene-3,20-dione.
7. A compound of the following formula

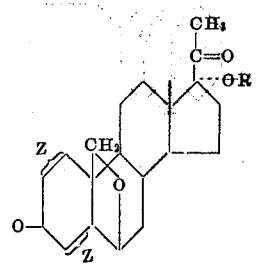

wherein R is selected from the group consisting of hydrogen and a hydrocarbon carboxylic acyl group containing less than 12 carbon atoms and Z is selected from the group consisting of a double bond between C-1,2 and C-4,5 and of a saturated linkage between C-1,2 and C-4,5.
8. 6β,19-oxido-pregnan-17α-ol-3,20-dione.
9. 6β,19-oxido-pregnan-17α-ol-3,20-dione acetate.
10. 6β,19-oxido-Δ$^{1,4}$-pregnadien-17α-ol-3,20-dione.
11. 6β,19-oxido-Δ$^{1,4}$-pregnadien-17α-ol-3,20-dione acetate.
12. A compound of the following formula:

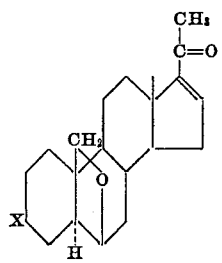

wherein X is selected from the group consisting of β-hydroxy and β-hydrocarbon carboxylic acyloxy containing less than 12 carbon atoms.
13. 6β,19-oxido-Δ$^{16}$-pregnen-3β-ol-20-one.
14. 6β,19-oxido-Δ$^{16}$-pregnen-3β-ol-20-one acetate.
15. 6β,19; 16α,17α-dioxido-pregnane-3β-ol-20-one.
16. A compound of the following formula:

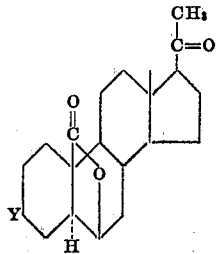

wherein Y is selected from the group consisting of keto, β-hydroxy and β-hydrocarbon carboxylic acyloxy containing less than 12 carbon atoms.
17. The 6,19-lactone of pregnane-3β,6β-diol-20-one-19-carboxylic acid.
18. The 6,19-lactone of pregnane-3β,6β-diol-20-one-19-carboxylic acid-3-acetate.
19. The 6,19-lactone of pregnan-6β-ol-3,20-dione-19-carboxylic acid.

20. A compound of the following formula:
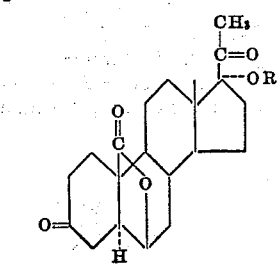
wherein R is selected from the group consisting of hydrogen and a hydrocarbon carboxylic acyl group containing less than 12 carbon atoms.
21. The 6,19-lactone of pregnane-6β,17α-diol-3,20-dione-19-carboxylic acid-17-acetate.
No references cited.